United States Patent [19]
Lyons et al.

[11] Patent Number: 5,097,190
[45] Date of Patent: Mar. 17, 1992

[54] ROTOR POSITION ESTIMATOR FOR A SWITCHED RELUCTANCE MACHINE

[75] Inventors: James P. Lyons, Niskayuna; Stephen R. MacMinn, Schenectady, both of N.Y.

[73] Assignee: General Electric Company, Schenectady, N.Y.

[21] Appl. No.: 653,374

[22] Filed: Feb. 11, 1991

[51] Int. Cl.⁵ .............................................. H02P 8/00
[52] U.S. Cl. .................................. 318/701; 318/254
[58] Field of Search .............. 318/701, 696, 138, 254, 318/671, 685

[56] References Cited

U.S. PATENT DOCUMENTS

| | | | |
|---|---|---|---|
| 4,584,506 | 4/1986 | Kaszmann | 318/701 |
| 4,739,240 | 4/1988 | MacMinn et al. | 318/696 |
| 4,772,839 | 9/1988 | MacMinn et al. | 318/696 |
| 4,896,089 | 1/1990 | Kliman et al. | 318/701 |
| 4,933,620 | 6/1990 | MacMinn et al. | 318/696 |
| 4,959,596 | 9/1990 | MacMinn et al. | 318/254 |
| 4,961,038 | 10/1990 | MacMinn et al. | 318/696 |
| 4,990,843 | 2/1991 | Moren et al. | 318/701 |

Primary Examiner—William M. Shoop, Jr.
Assistant Examiner—John W. Cabeca
Attorney, Agent, or Firm—Jill M. Breedlove; James C. Davis, Jr.; Marvin Snyder

[57] ABSTRACT

A method and apparatus for indirectly determining rotor position in a switched reluctance motor (SRM) are based on instantaneous flux and phase current sensing. For each phase in a predetermined sequence of phase sensing, which depends on the particular quadrant of machine operation, phase flux and phase current measurements are made during operation in a pair of predetermined sensing regions each defined over a range of rotor angles. Rotor angle estimates are derived from the flux and phase current measurements made during the sensing region for each respective phase. The rotor angle estimates for each phase are normalized with respect to a common reference and then used to generate a rotor position estimate for the SRM.

10 Claims, 8 Drawing Sheets

ROTOR POSITION ESTIMATOR FOR A SWITCHED RELUCTANCE MACHINE

RELATED PATENT APPLICATIONS

This patent application is related to commonly assigned U.S. patent application of J. P. Lyons and S. R. MacMinn entitled "Rotor Position Estimator for a Switched Reluctance Machine Using Lumped Parameter Flux/Current Model", Ser. No. 07/653,371, filed concurrently herewith and incorporated by reference herein.

FIELD OF THE INVENTION

The present invention relates generally to switched reluctance machines and, more particularly, to a rotor position estimator therefore.

BACKGROUND OF THE INVENTION

A switched reluctance machine (SRM) is a brushless, synchronous machine having salient rotor and stator poles. There is a concentrated winding on each of the stator poles, but no windings or permanent magnets on the rotor. Each pair of diametrically opposite stator pole windings is connected in series or in parallel to form an independent machine phase winding of the multiphase SRM. Ideally, the flux entering the rotor from one stator pole balances the flux leaving the rotor from the diametrically opposite stator pole, so that there is no mutual magnetic coupling among the phases.

Torque is produced by switching current in each phase winding in a predetermined sequence that is synchronized with angular position of the rotor. In this way, a magnetic force of attraction results between the rotor poles and stator poles that are approaching each other. The current is switched off in each phase before the rotor poles nearest the stator poles of that phase rotate past the aligned position;-otherwise, the magnetic force of attraction would produce a negative or braking torque. Hence, by properly positioning the firing pulses relative to rotor angle, forward or reverse operation and motoring or generating operation can be obtained. Typically, the desired phase current commutation is achieved by feeding back the rotor position signal to a controller from a shaft angle transducer, e.g. an encoder or a resolver. To improve reliability and to reduce size, weight, inertia, and cost in such drives, it is desirable to eliminate this shaft position sensor. To this end, various approaches have been previously proposed for indirect rotor position sensing by monitoring terminal voltages and currents of the motor. One such approach, referred to as waveform detection, depends upon back electromotive forces (emf) and is, therefore, unreliable at low speeds and inoperative at zero speed.

Another approach to indirect rotor position sensing is disclosed in commonly assigned U.S. Pat. No. 4,772,839, issued Sept. 20, 1988 to S. R. MacMinn and P. B. Roemer, which patent is incorporated by reference herein. The cited patent describes an indirect position estimator for a SRM which applies low-level sensing pulses of short duration to the unenergized motor phases. Application of the sensing pulses results in a change in current in each of the unenergized phases. The change in current is sensed by a current sensor and an estimated inductance value is derived therefrom. A pair of estimated rotor angles corresponding to the estimated inductance value for each of the unenergized phases is ascertained. One such pair is shifted by a value equal to a known phase displacement of the other unenergized phase. The pairs of estimated angles are then compared to determine which of the angles match. An estimated instantaneous rotor angular position equal to the matching angle is produced. Moreover, in case any of the stator phases undergoes a change in state during sampling or in case two phases do not remain energized throughout the sampling, an extrapolator is provided to generate an extrapolated rotor angular position instead of the estimated position.

Still another approach to indirect rotor position sensing is disclosed in commonly assigned U.S. Pat. No. 4,959,596, issued to S. R. MacMinn, C. M. Stephens and P. M. Szczesny on Sept. 25, 1990, which patent is incorporated by reference herein. According to U.S. Pat. No. 4,959,596, a method of indirect rotor position sensing involves applying voltage sensing pulses to one unenergized phase. The result is a change in phase current which is proportional to the instantaneous value of the phase inductance. Proper commutation time is determined by comparing the change in phase current to a threshold current, thereby synchronizing phase excitation to rotor position. Phase excitation can be advanced or retarded by decreasing or increasing the threshold, respectively.

Although the patents hereinabove cited advantageously provide methods for indirectly determining rotor position so that a conventional rotor position sensor is not required, it may be desirable in some applications to avoid active probing of the motor phases, i.e. by applying sensing pulses thereto, since such probing generally results in speed limitations.

OBJECTS OF THE INVENTION

Accordingly, an object of the present invention is to provide a new and improved method and apparatus for indirectly sensing rotor position in a SRM.

Another object of the present invention is to provide a method for indirectly determining rotor position in a SRM which does not require active probing of the motor phase windings, but which efficiently and accurately determines rotor position from measured phase terminal quantities.

Still another object of the present invention is to provide a rotor position estimator for a SRM which indirectly determines rotor position from measured phase terminal quantities and does not require active probing of the motor phase windings.

SUMMARY OF THE INVENTION

The foregoing and other objects of the present invention are achieved in a method and apparatus for indirectly determining rotor position in a SRM based on instantaneous phase flux and phase current measurements. Phase current and flux sensing are performed in a predetermined sequence that depends on the particular quadrant of operation, i.e. forward motoring, reverse motoring, forward generating, or reverse generating. For each phase in the predetermined sequence of sensing, phase flux and phase current measurements are made during operation in a pair of predetermined sensing regions, each defined over a range of rotor angles. Rotor angle estimates are derived from the phase flux and phase current measurements for each respective phase during the respective sensing regions thereof. The rotor angle estimates for each phase are normalized with respect to a common reference phase, and a rotor position estimate for the SRM is computed according to the following equation:

$$\hat{\theta}r = SIDE \cdot \hat{\theta}n + 2\pi,$$

wherein $\hat{\theta}^r$ represents the rotor position estimate of the SRM; $\hat{\theta}^n$ represents the normalized rotor angle estimate for the respective phase; and SIDE is equal to $+1$ or $-1$, depending upon whether rotor poles of the SRM are approaching alignment or unalignment, respectively, with stator poles of the phase being sensed.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1A:
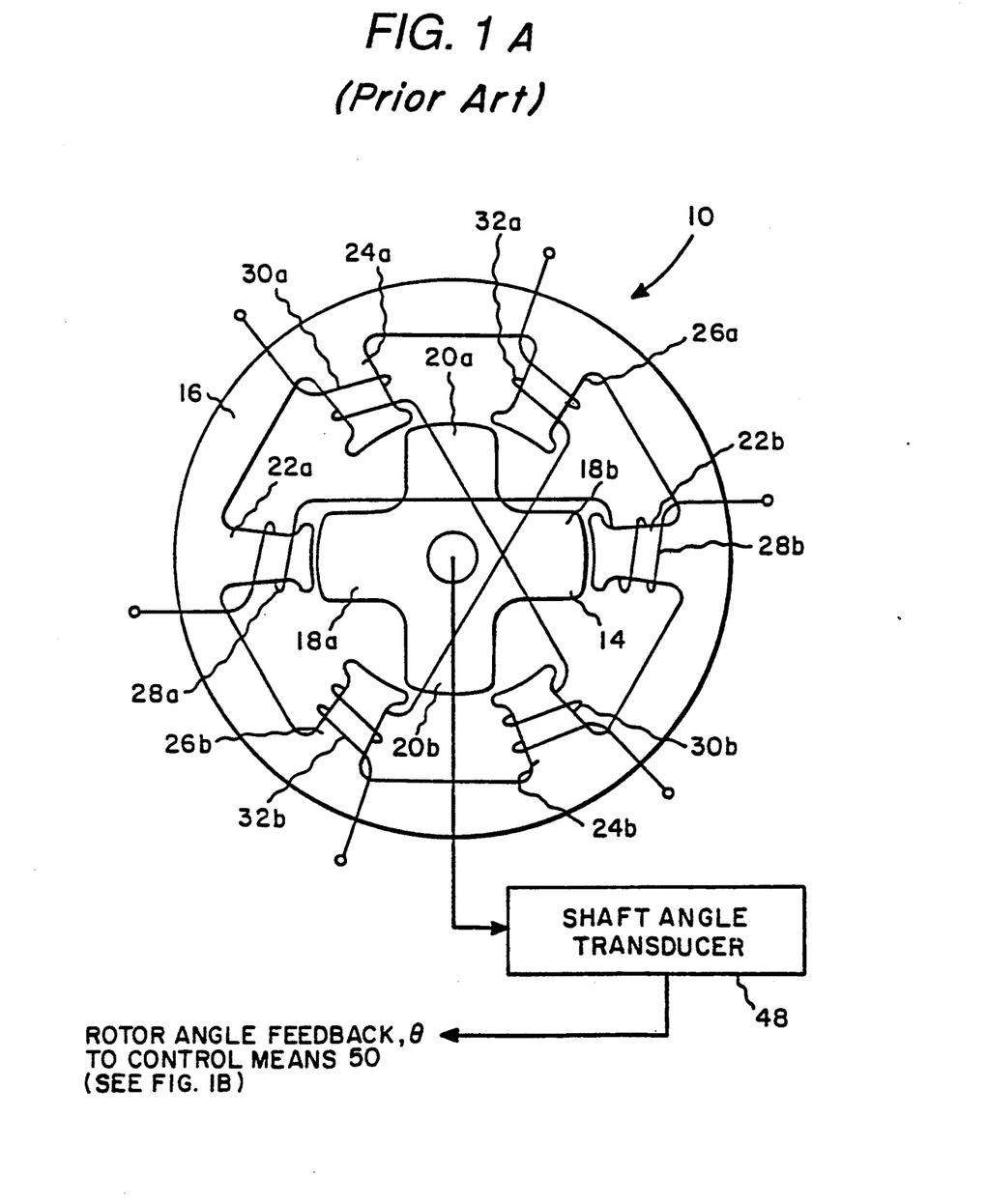
FIG. 1 is a schematic illustration of a conventional SRM drive.
Figure 1B:
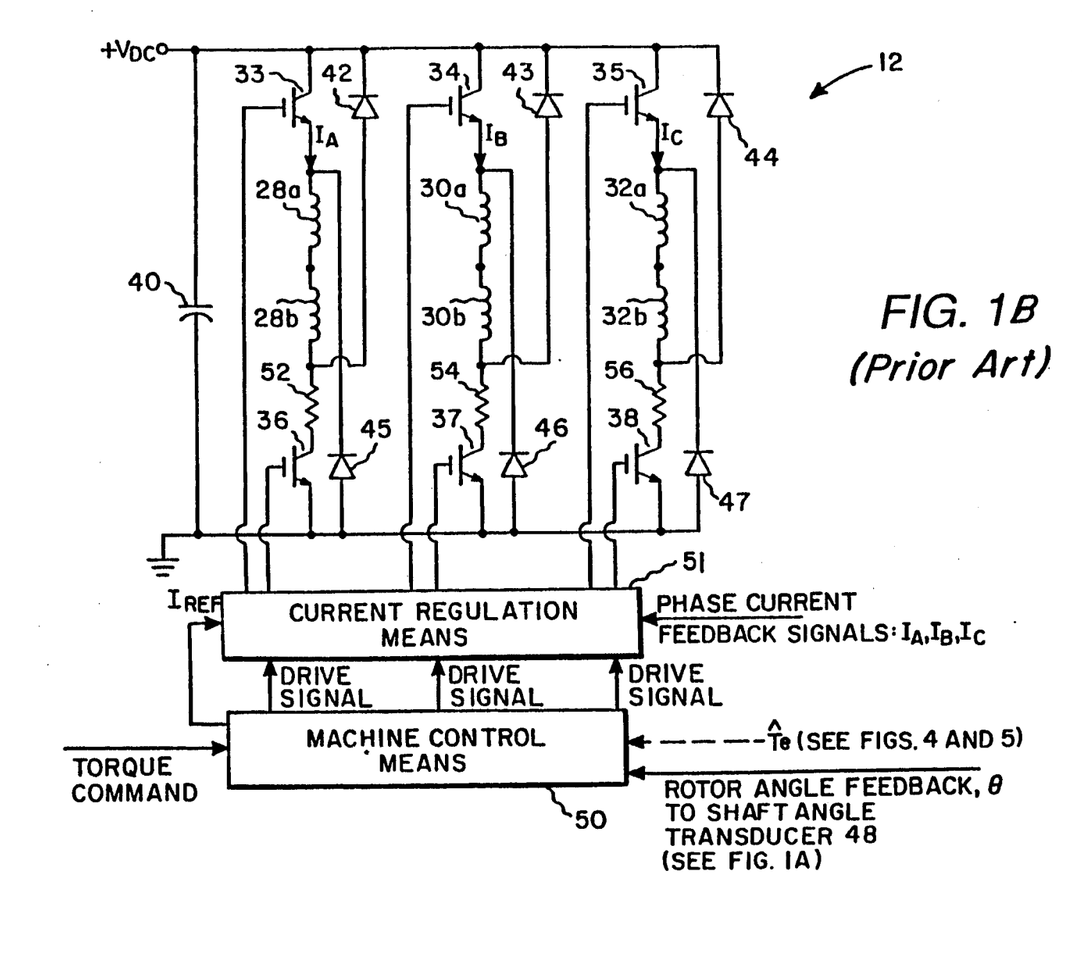

FIG. 1 shows a conventional SRM drive configuration. By way of example, SRM 10 is illustrated as a three-phase machine with its associated power inverter 12. As shown, SRM 10 includes a rotor 14 rotatable in either a forward or reverse direction within a stationary stator 16. Rotor 14 has two pairs of diametrically opposite rotor poles 18a-18b and 20a-20b. Stator 16 has three pairs of diametrically opposite stator poles 22a-22b, 24a-24b and 26a-26b. Stator pole windings 28a-28b, 30a-30b and 32a-32b, respectively, are wound on stator pole pairs 22a-22b, 24a-24b and 26a-26b, respectively. Conventionally, the stator pole windings on each pair of opposing or companion stator pole pairs are connected in series or parallel to form a machine phase winding. As illustrated in FIG. 1, the stator pole windings comprising each companion pair 28a-28b, 30a-30b and 32a-32b, respectively, are connected in series with each other and with an upper current switching device 33, 34 and 35, respectively, and with a lower current switching device 36, 37 and 38, respectively. The upper and lower switching devices are each illustrated as comprising an insulated gate bipolar transistor (IGT), but other suitable current switching devices may be used; for example, field effect transistors (FET's), gate turn-off thyristors (GTO's), or bipolar junction transistors (BJT's). Each phase winding is further coupled to a dc source, such as a battery or a rectified ac source, by flyback or return diodes 45 and 42, 46 and 43, and 47 and 44, respectively. At the end of each conduction interval of each phase, stored magnetic energy in the respective phase winding is returned, through the respective pair of these diodes connected thereto, to the dc source. Each series combination of the phase winding with two corresponding switching devices and two flyback diodes comprises one phase leg of inverter 12. The inverter phase legs are connected in parallel to each other and are driven by the dc source, which impresses a dc voltage $V_{dc}$ across the parallel inverter phase legs. Capacitance 40 is provided for filtering transient voltages from the dc source and for supplying ripple current to the inverter.

Typically, as shown in FIG. 1, a shaft angle transducer 48, e.g. an encoder or a resolver, is coupled to rotor 14 for providing rotor angle feedback signals to machine control means 50. An operator command, such as a torque command, is also generally supplied as an input signal to control means 50. Phase current feedback signals are supplied to a current regulation means 51 which receives phase current feedback signals $I_A$, $I_B$ and $I_C$ from current sensors 52, 54 and 56. Suitable current sensors are well-known in the art and may comprise, for example, Hall-effect sensors, sensing transformers, sensing transistors, or sensing resistors. Control means 50 further provides a commanded reference current waveform $I_{REF}$ to current regulation means 51, as described in commonly assigned U.S. Pat. No. 4,961,038, issued to S. R. MacMinn on Oct. 2, 1990, which patent is incorporated by reference herein. In well-known fashion, such as described in commonly assigned U.S. Pat. No. 4,739,240, issued to S. R. MacMinn and P. M. Szczesny on Apr. 19, 1988, which patent is also incorporated by reference herein, the control means provides firing signals to inverter 12 for energizing the machine phase windings in a predetermined sequence, depending upon the particular quadrant of operation.

Saliency of both the rotor and stator of a SRM causes the machine to have an air gap of varying length. As a result, phase inductance as viewed from the stator phase windings is a strong function of rotor position. Specifically, phase inductance ranges from a maximum value $L_a$, corresponding to alignment of rotor poles with the stator poles of the respective phase, to a minimum value $L_u$, corresponding to maximum unalignment of rotor poles with the stator poles of the respective phase.

In accordance with the present invention, a method of indirect rotor position sensing involves instantaneous phase flux and phase current sensing in a predetermined sequence that depends on the particular quadrant of operation, i.e. forward motoring, reverse motoring, forward generating, or reverse generating. For each phase in the predetermined sequence of sensing, phase flux and phase current measurements are made during operation in a pair of predetermined sensing regions, each defined over a range of rotor angles as determined by phase inductance versus rotor angular position curves for a particular SRM, as described hereinbelow.

The current I in one phase winding of a SRM and the flux $\Psi$ linked by that winding are related by the winding inductance L according to the following expression:

$$\Psi = LI \tag{1}$$

Figure 2:
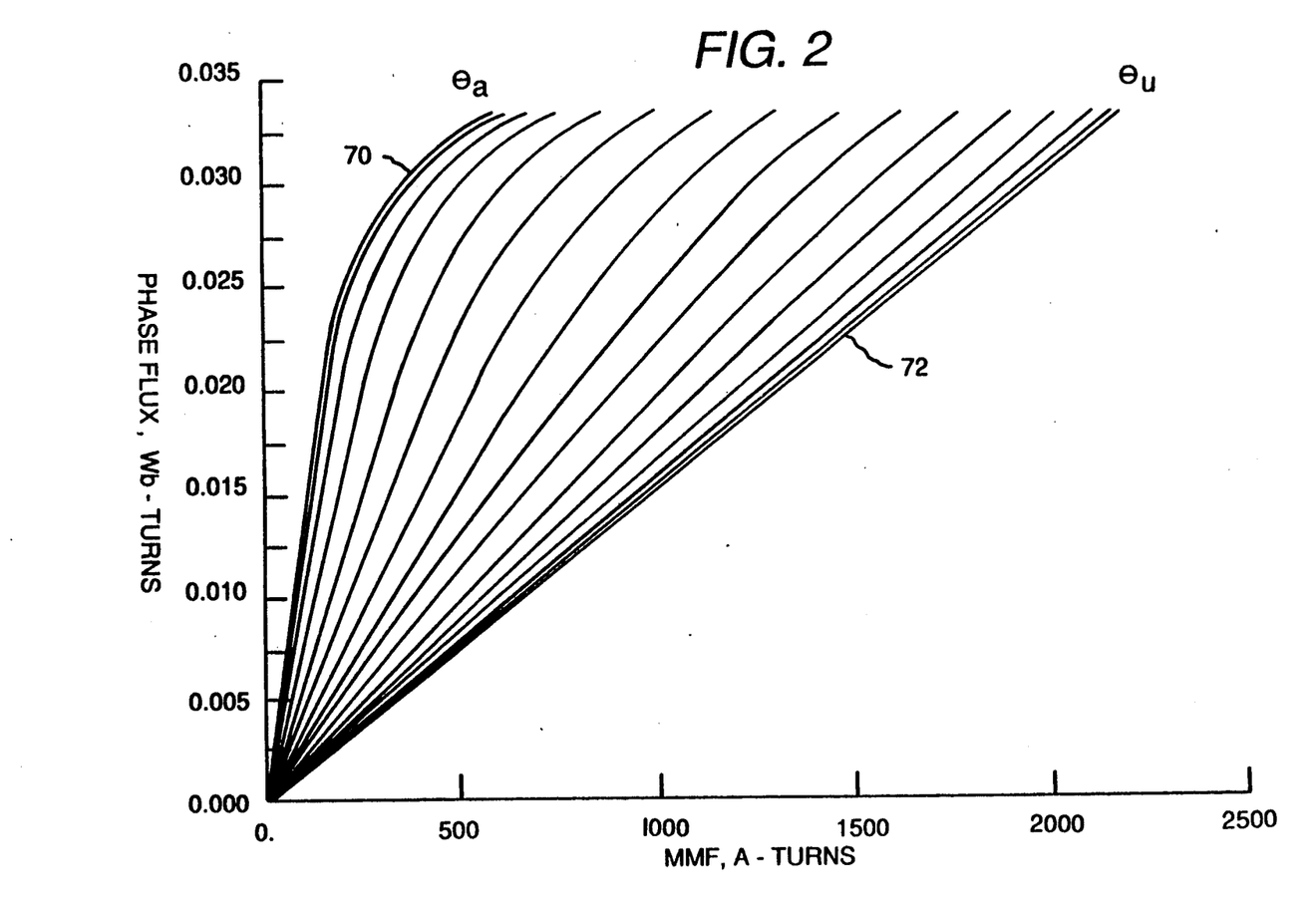
FIG. 2 is a graphical illustration of phase flux versus phase current for different values of rotor angle.

Thus, if phase flux linkage $\Psi$ is plotted against phase current I, the slope of the resulting graph is the phase inductance. FIG. 2 graphically illustrates phase flux $\Psi$ versus magnetomotive force (mmf, in ampere-turns) for different values of rotor angle $\theta$. The bending of the curves at the higher values of flux $\Psi$ is caused by magnetic saturation of the iron in the motor. Curve 70, which has the steepest initial slope, represents the $\Psi$-I curve for the excited phase when the stator poles of that phase are aligned with rotor poles, the rotor angle corresponding thereto being designated as $\theta_a$. On the other hand, curve 72, which has the smallest initial slope, represents the Ψ-I curve for the excited phase when the stator poles of that phase are at the point of maximum unalignment with rotor poles of the SRM, the rotor angle corresponding thereto being designated as $\theta_u$. The curves falling between curves 70 and 72 represent intermediate inductance values corresponding to varying degrees of rotor and stator pole overlap, with the slopes of the curves monotonically decreasing as the rotor advances from the aligned position to the unaligned position.

Figure 3:
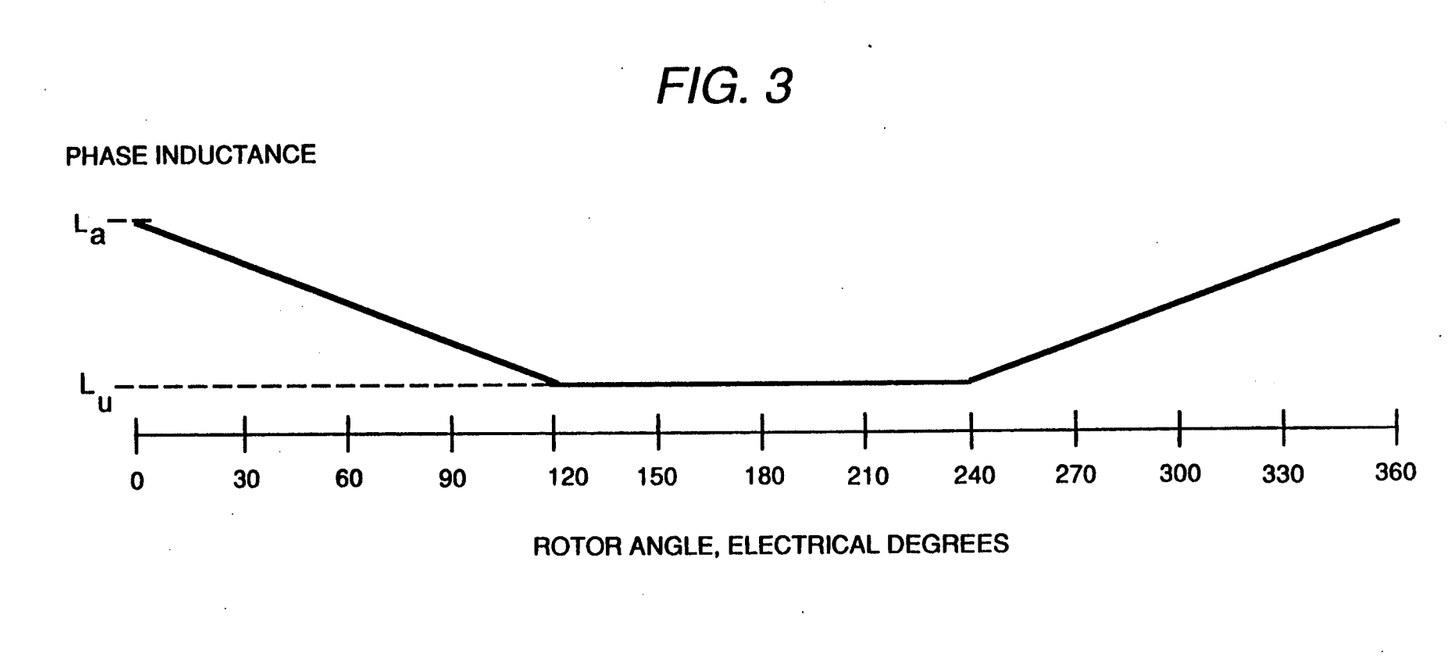
FIG. 3 is a graphical illustration of ideal phase inductance as a function of rotor angle.

Ideal phase inductance (i.e., neglecting saturation and leakage flux) is plotted as a function of rotor angle $\theta$, in electrical degrees, in FIG. 3. (As will be appreciated by those skilled in the art, in a SRM having a three-phase, 6–4 pole configuration, such as that illustrated in FIG. 1, a mechanical degree is one-fourth of an electrical degree. However, since electronic commutation is the concern herein, all positions will be described in terms of electrical degrees.) In particular, phase inductance L is a two-valued function of rotor position $\theta$. That is, a given inductance value occurs once as the rotor poles are moving toward alignment with stator poles of a respective phase, and again as the poles are moving away from alignment. From equation (1), it is apparent that this value of inductance can be determined by corresponding measurements of phase flux Ψ and phase current I. To this end, stator flux linkage Ψ may be measured directly using well-known sensing coils; however, such coils are typically fragile and unreliable. Therefore, under most operating conditions, an accurate determination of phase flux linkage Ψ can be made by employing the relationship between phase flux linkage Ψ, phase current I, and phase voltage V according to the following expression:

$$V = Ir + \frac{d\Psi}{dt}, \quad (2)$$

where r is the phase winding resistance. An estimate of the flux linkage $\hat{\Psi}$ can thus be determined from:

$$\Psi = \int(V - IR)dt \quad (3)$$

Advantageously, since the flux linkage returns to zero at the end of each electrical cycle in a SRM, an integrator employed to estimate the flux linkage $\hat{\Psi}$ can be reset to zero at the end of each cycle, thus avoiding an accumulation of errors.

Figure 4:
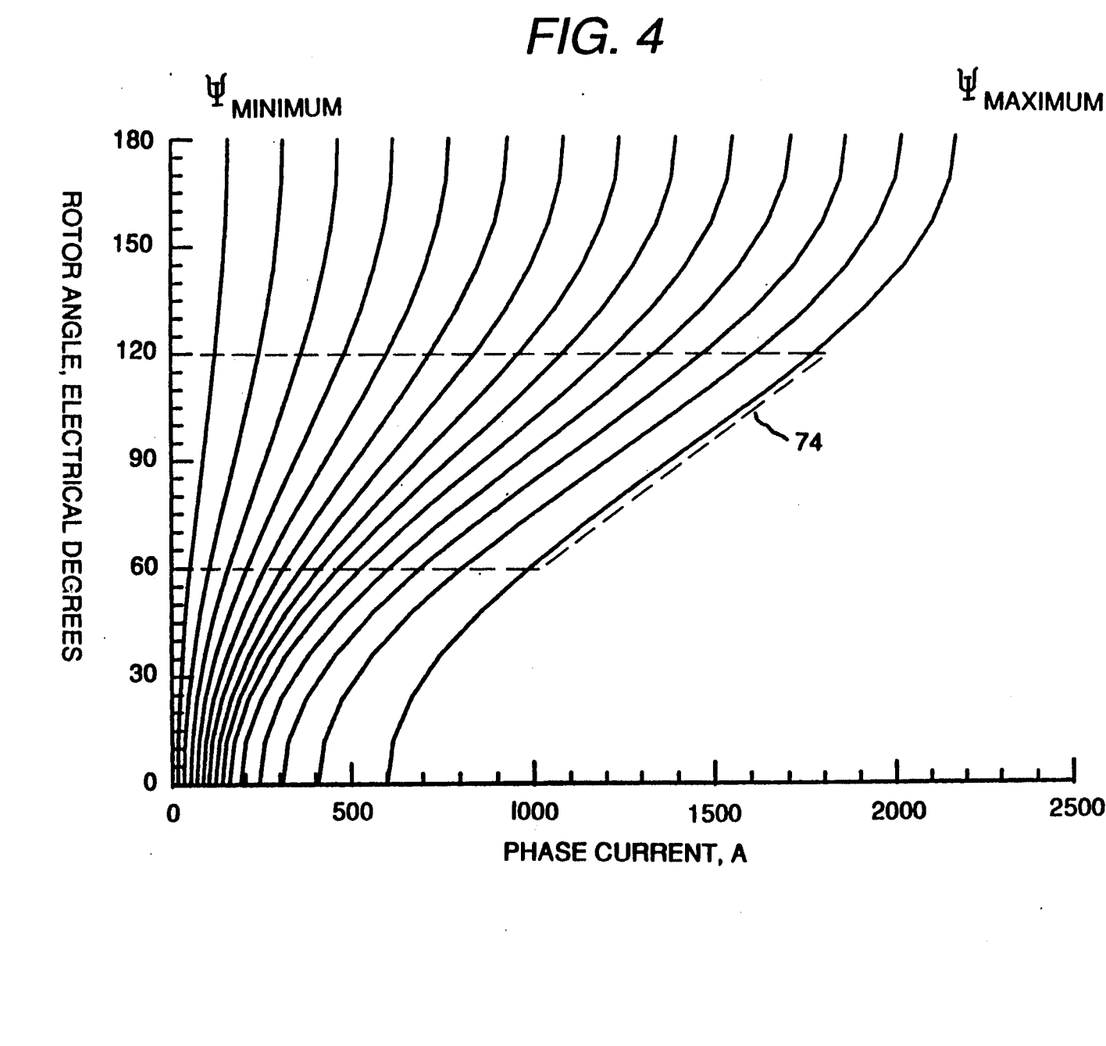
FIG. 4 is a graphical illustration of rotor angle versus phase current for different values of phase flux.

FIG. 4 illustrates rotor angle $\theta$ versus phase current I as a function of flux linkage Ψ, wherein $\theta = 0$ represents unalignment. From FIG. 4, it is apparent that for relatively small values of $\theta$, i.e. near maximum unalignment, relatively small errors in current or flux measurements may result in relatively large errors in the rotor angle estimate. Similarly, at rotor angles approaching alignment, relatively small errors in current or flux measurements may result in relatively large errors in the angle estimate. Therefore, in accordance with the present invention, a pair of sensing regions is defined for each phase. The boundaries of each sensing region depends on the magnetization characteristics of the particular SRM being employed. For the SRM having the characteristics illustrated in FIG. 4, for example, suitable sensing regions are defined by the dashed lines 74. Specifically, for the SRM represented by the curves of FIG. 4, the valid sensing regions range from 120° before alignment to 60° before alignment, and from 60° after alignment to 120° after alignment. In the sensing region, the Ψ-I curves are separated sufficiently and have easily measurable slopes, so that error sensitivity is minimized.

Figure 5:
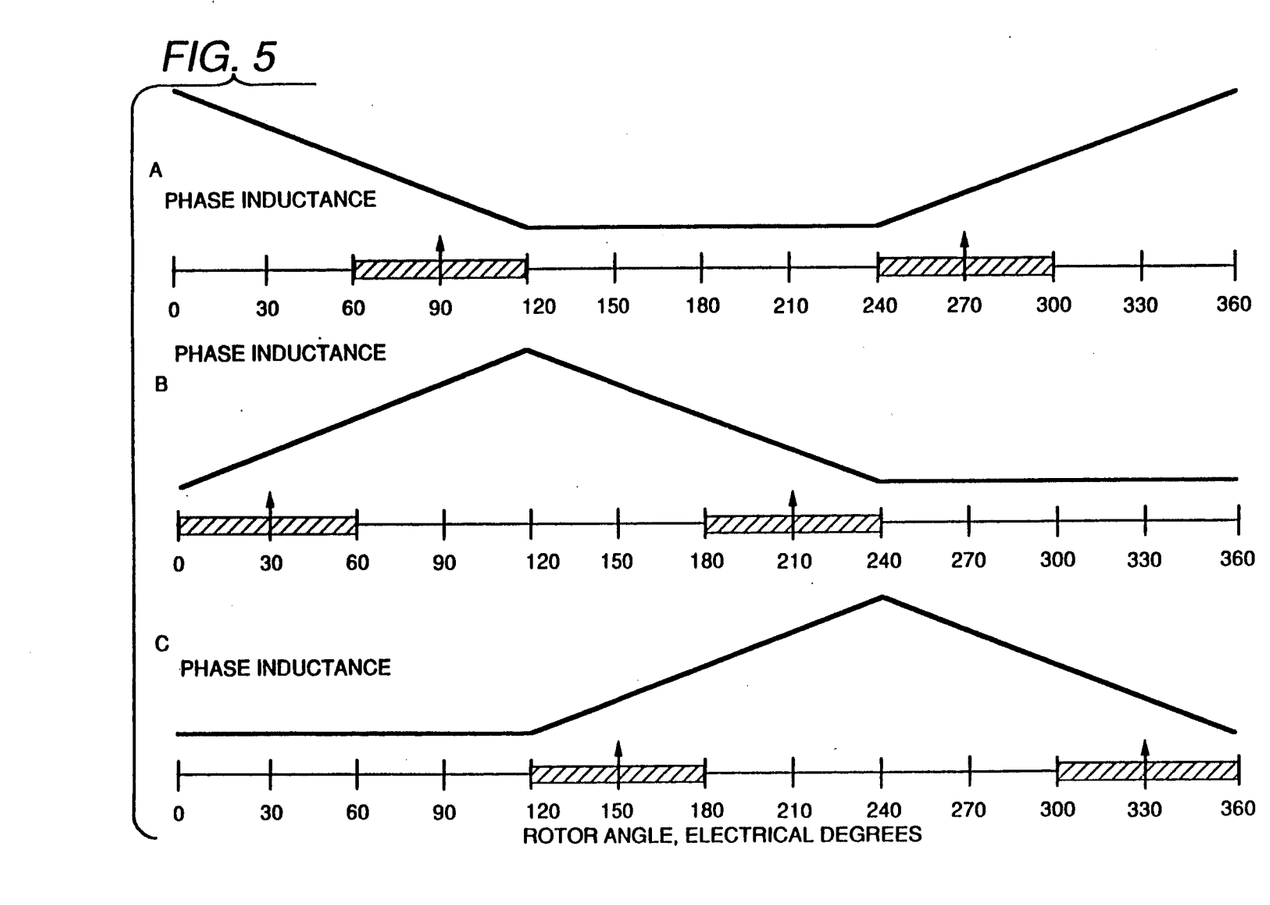
FIG. 5 is a graphical illustration of phase inductance versus rotor angle which shows the sensing regions for each respective phase for a three-phase SRM.

FIG. 5 graphically illustrates phase inductance L versus rotor angle $\theta$ for each phase A, B and C of a three-phase SRM, such as the one illustrated in FIG. 1. The cross-hatched rectangular regions in each graph correspond to the sensing regions for each respective phase. For the SRM represented by the graphs of FIG. 5, the sensing regions for each phase extend from 60° after alignment to 120° after alignment, and from 120° before alignment to 60° before alignment. (Additionally, optimal sampling instants in each respective sensing region are indicated by arrows for a discrete implementation of the position estimator of the present invention.) For forward rotation of the SRM, phase sensing should be performed in the following phase sequence: A, C, B, A . . . During each sensing region of each respective phase, instantaneous phase current and flux measurements are made and corresponding rotor angle estimates $\hat{\theta}^m$ are derived therefrom. A rotor angle estimate $\hat{\theta}^m$ for each phase is a measure of how far rotor poles of the SRM are from alignment with the stator poles of the phase being measured.

Figure 6:
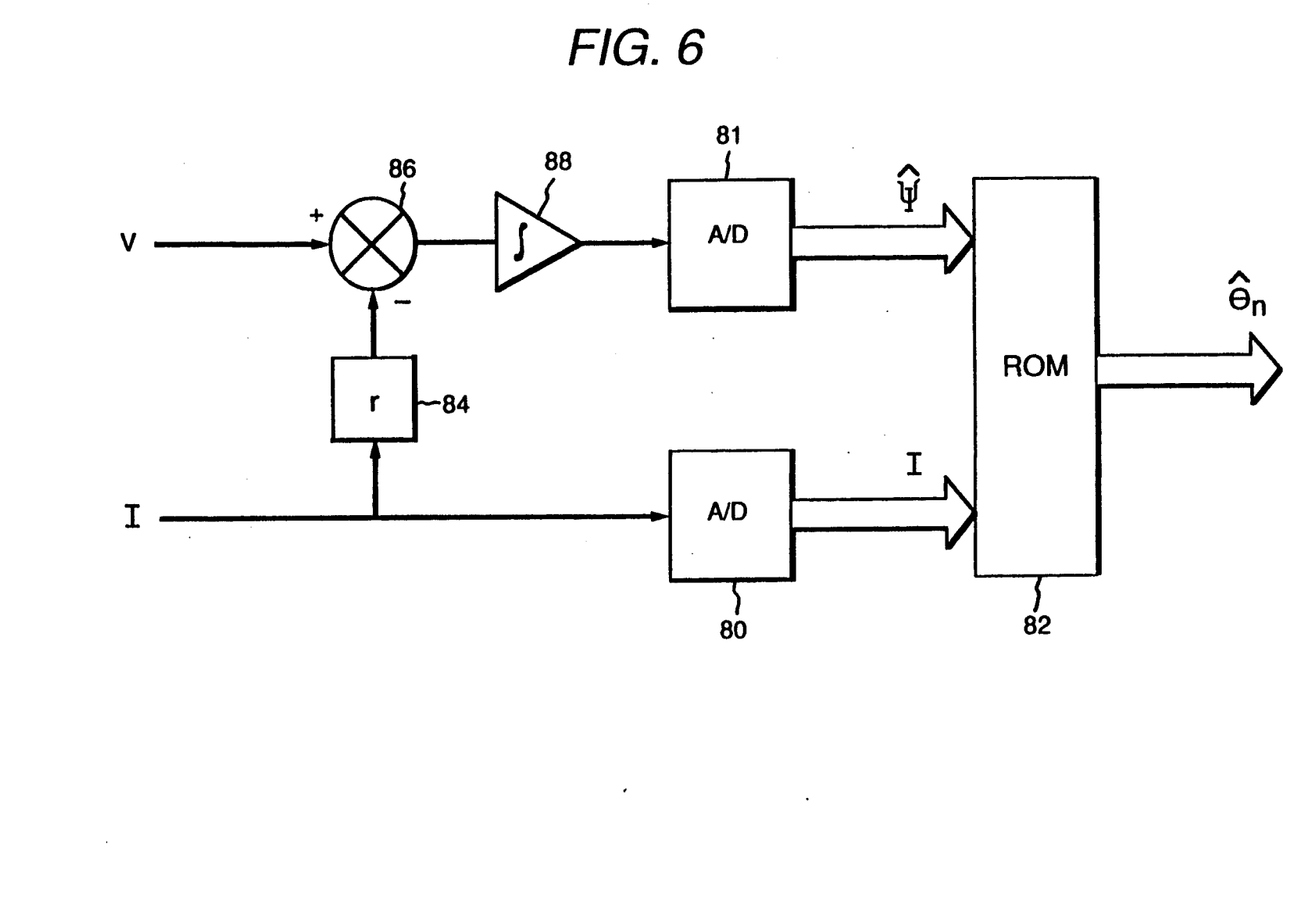
FIG. 6 is a block diagram or a preferred embodiment of a rotor position estimator of the present invention.

FIG. 6 illustrates a preferred hardware implementation useful in making phase angle estimates $\hat{\theta}^m$ according to the method of the present invention. Phase current I is sensed by a suitable current sensor 76, and phase winding voltage V is sensed by a suitable voltage sensor 78. The phase current I is converted to a digital signal in an analog-to-digital converter 80 and then used as a partial address for a read-only-memory (ROM) 82 which contains a look-up table for providing a rotor angle estimate $\hat{\theta}^m$ corresponding to the sensed values of phase flux and phase current. The phase current I is also provided to a multiplier 84 wherein it is multiplied by the phase winding resistance r, and the result is subtracted from the phase voltage V by a summer 86. The output signal from summer 86 is integrated by an integrator 88 to provide an estimate of the phase flux Ψ. The phase flux signal is provided via analog-to-digital converter 81 as the remainder of the address for ROM 82.

In accordance with the present invention, to obtain the rotor position estimate $\hat{\theta}^r$ from each respective phase angle estimate $\hat{\theta}^m$, each phase angle estimate $\hat{\theta}^m$ is initially normalized with respect to one phase, e.g. phase A, to provide a normalized phase angle estimate $\hat{\theta}^n$ for each phase. Thus, for the illustrated three-phase SRM, 120° are added to the phase angle estimate for phase B, and 240° are added to the phase angle estimate for phase C. Furthermore, a flag, designated herein as SIDE, is employed to keep track of whether rotor poles of the SRM are approaching alignment or unalignment with the stator poles of each respective phase. By way of example, for rotor poles approaching alignment, SIDE = −1; and for rotor poles approaching unalignment, SIDE = +1. The SIDE flag is initialized at machine start-up by test probing at least two phases to determine the direction of rotation. Finally, the rotor position estimate $\hat{\theta}^r$ is determined according to the following expression:

$$\hat{\theta}^r = SIDE \cdot \hat{\theta}^n + 2\pi.$$

Figure 7:
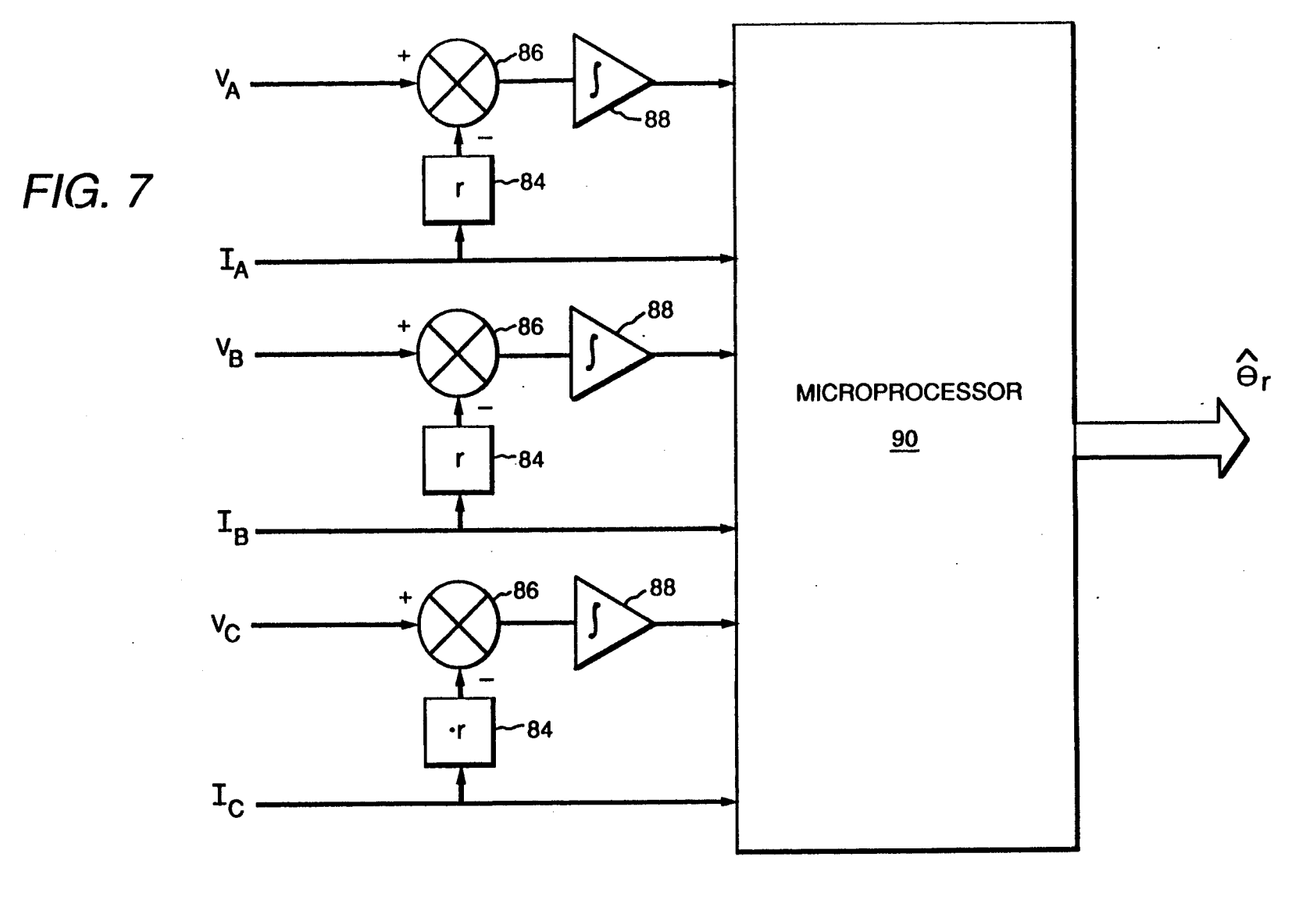
FIG. 7 is a block diagram of an alternative preferred implementation of the rotor position estimator of the present invention.

FIG. 7 illustrates an alternative embodiment of the rotor position estimator of the present invention wherein the phase currents $I_A$, $I_B$ and $I_C$ and phase winding voltages $V_A$, $V_B$ and $V_C$ are provided to a microprocessor 90 which performs the functions of A/D converters 80 and 81 and ROM 82. In addition, such a microprocessor 90 computes the rotor position estimate $\hat{\theta}^r$ for the motor.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for estimating rotor position of a switched reluctance motor including a stator having a plurality of pairs of opposing stator poles and a rotor having a plurality of rotor poles, each respective phase of said motor comprising at least one of said pairs of opposing stator poles and a phase winding wound thereon, said method comprising the steps of:

sensing phase current in each respective phase of said switched reluctance motor during a operation in a pair of sensing regions each corresponding to a predetermined range of rotor angles and according to a predetermined phase sensing sequence;

sensing phase flux in each respective phase of said switched reluctance motor during operation in each respective sensing region according to said predetermined phase sensing sequence;

determining whether rotor poles of said switched reluctance motor are approaching alignment with the stator poles of each respective phase during operation in each respective sensing region according to said predetermined phase sensing sequence;

generating a rotor angle estimate corresponding to each respective value of phase flux and phase current during operation in each respective sensing region for each respective phase;

normalizing each respective rotor angle estimate with respect to one phase of said switched reluctance motor; and computing a rotor position estimate $\hat{\theta}^r$ for said motor according to the expression:

$$\hat{\theta}^r = SIDE \cdot \hat{\theta}^n + 2\pi,$$

wherein $\hat{\theta}^n$ represents the normalized rotor position estimate for the respective phase of said motor, and SIDE is equal to +1 or −1, depending upon whether the rotor poles of said motor are approaching alignment or unalignment, respectively, with the stator poles of the respective phase of said motor.

2. The method of claim 1 wherein the step of sensing phase flux comprises sensing the voltage V across the respective phase winding and computing the phase flux $\Psi$ according to the expression:

$$\Psi = \int (V - Ir) dt,$$

where r is the phase winding resistance, and I is the phase current.

3. The method of claim 1 wherein the step of generating a rotor angle estimate corresponding to each respective value of phase flux and phase current comprises extracting each respective rotor angle estimate from a look-up table.

4. The method of claim 1 wherein the steps of generating a rotor angle estimate, normalizing each respective rotor angle estimate with respect to one phase of said switched reluctance motor, and computing a rotor position estimate $\hat{\theta}^r$ for said motor are performed by a microprocessor.

5. The method of claim 1 wherein each respective pair of sensing regions comprises a pair of discrete sampling instants.

6. A rotor position estimator for a switched reluctance motor including a stator having a plurality of pairs of opposing stator poles and a rotor having a plurality of rotor poles, each respective phase of said motor comprising at least one of said pairs of opposing stator poles and a phase winding wound thereon, said rotor position estimator comprising:

current sensing means for sensing phase current in each respective phase of said switched reluctance motor during operation in a pair of sensing regions each corresponding to a predetermined range of rotor angles and according to a predetermined phase sensing sequence;

flux sensing means for sensing phase flux in each respective phase of said switched reluctance motor during operation in each respective sensing region according to said predetermined phase sensing sequence;

direction means for determining whether rotor poles of said switched reluctance motor are approaching alignment with the stator poles of each respective phase during operation in each respective sensing region according to said predetermined phase sensing sequence;

means for generating a rotor angle estimate corresponding to each respective value of phase flux and phase current during operation in each respective sensing region for each respective phase;

means for normalizing each respective rotor angle estimate with respect to one phase of said switched reluctance motor; and calculating means for generating a rotor position estimate $\hat{\theta}^r$ for said motor according to the expression:

$$\hat{\theta}^r = SIDE \cdot \hat{\theta}^n + 2\pi,$$

wherein $\hat{\theta}^n$ represents the normalized rotor position estimate for the respective phase of said motor, and SIDE is equal to +1 or −1, depending upon whether the rotor poles of said motor are approaching alignment or unalignment, respectively, with the stator poles of the respective phase of said motor.

7. The rotor position estimator of claim 6 wherein said flux sensing means comprises:

voltage sensing means for sensing voltage across the phase winding of each respective phase of said switched reluctance motor during operation in each respective sensing region according to said predetermined phase sensing sequence; and integrating means for providing a phase flux estimate from the sensed phase current and voltage of each respective phase of said switched reluctance motor.

8. The rotor position estimator of claim 6 wherein said means for generating a rotor angle estimate a look-up table.

9. The rotor position estimator of claim 6 wherein said means for generating a rotor angle estimate, means for normalizing each respective rotor angle estimate and said calculating means together comprise a microprocessor.

10. The rotor position estimator of claim 6 wherein each respective pair of sensing regions comprises a pair of discrete sampling instants.

* * * * *